US011748709B2

(12) United States Patent
Shor

(10) Patent No.: US 11,748,709 B2
(45) Date of Patent: Sep. 5, 2023

(54) SYSTEMS AND PROGRAMS FOR PROJECT PORTFOLIO MANAGEMENT

(71) Applicant: PROJECT MAP LTD., Kfar Saba (IL)

(72) Inventor: Yaniv Shor, Shoham (IL)

(73) Assignee: PROJECT MAP LTD., Kfar Saba (IL)

( * ) Notice: Subject to any disclaimer, the term of this patent is extended or adjusted under 35 U.S.C. 154(b) by 357 days.

(21) Appl. No.: 17/084,661

(22) Filed: Oct. 30, 2020

(65) Prior Publication Data

US 2021/0049555 A1  Feb. 18, 2021

Related U.S. Application Data

(63) Continuation-in-part of application No. 16/084,539, filed as application No. PCT/IL2017/050292 on Mar. 8, 2017, now abandoned.

(60) Provisional application No. 62/307,601, filed on Mar. 14, 2016.

(51) Int. Cl.

| | |
|---|---|
| *G06Q 10/10* | (2023.01) |
| *G06Q 10/0635* | (2023.01) |
| *G06F 3/04817* | (2022.01) |
| *G06F 3/0482* | (2013.01) |
| *G06N 20/00* | (2019.01) |

(52) U.S. Cl.
CPC ......... *G06Q 10/103* (2013.01); *G06F 3/0482* (2013.01); *G06F 3/04817* (2013.01); *G06N 20/00* (2019.01); *G06Q 10/0635* (2013.01)

(58) Field of Classification Search
CPC .............. G06Q 10/103; G06Q 10/0635; G06F 3/04817; G06F 3/0482; G06N 20/00
See application file for complete search history.

(56) References Cited

U.S. PATENT DOCUMENTS

| | | | |
|---|---|---|---|
| 7,222,369 B2 * | 5/2007 | Vering ................ | G06F 21/6218 715/740 |
| 8,249,906 B2 * | 8/2012 | Ponce de Leon .. | G06Q 10/0635 705/7.17 |
| 10,725,639 B1 * | 7/2020 | Ponce de Leon ..... | G06F 3/0486 |
| 2009/0199113 A1 * | 8/2009 | McWhinnie ........... | G06Q 10/10 715/762 |
| 2014/0006938 A1 * | 1/2014 | Black .................... | G06F 40/166 715/255 |
| 2020/0233662 A1 * | 7/2020 | Bissonette ......... | G06Q 10/0635 |

\* cited by examiner

*Primary Examiner* — Cao H Nguyen
(74) *Attorney, Agent, or Firm* — THE IP LAW FIRM OF GUY LEVI, LLC

(57) ABSTRACT

The disclosure relates to systems, methods and computer readable media for managing, analyzing and displaying project portfolios and their various interdependencies. More specifically, the disclosure relates to systems, methods and computer readable media for analyzing critical workstream data which connection with other workstreams in the same or other projects affect coordination and other milestones, and displaying project portfolios and their various interdependencies, in a three-layer configuration providing higher degree of data granularity at each layer.

20 Claims, 14 Drawing Sheets

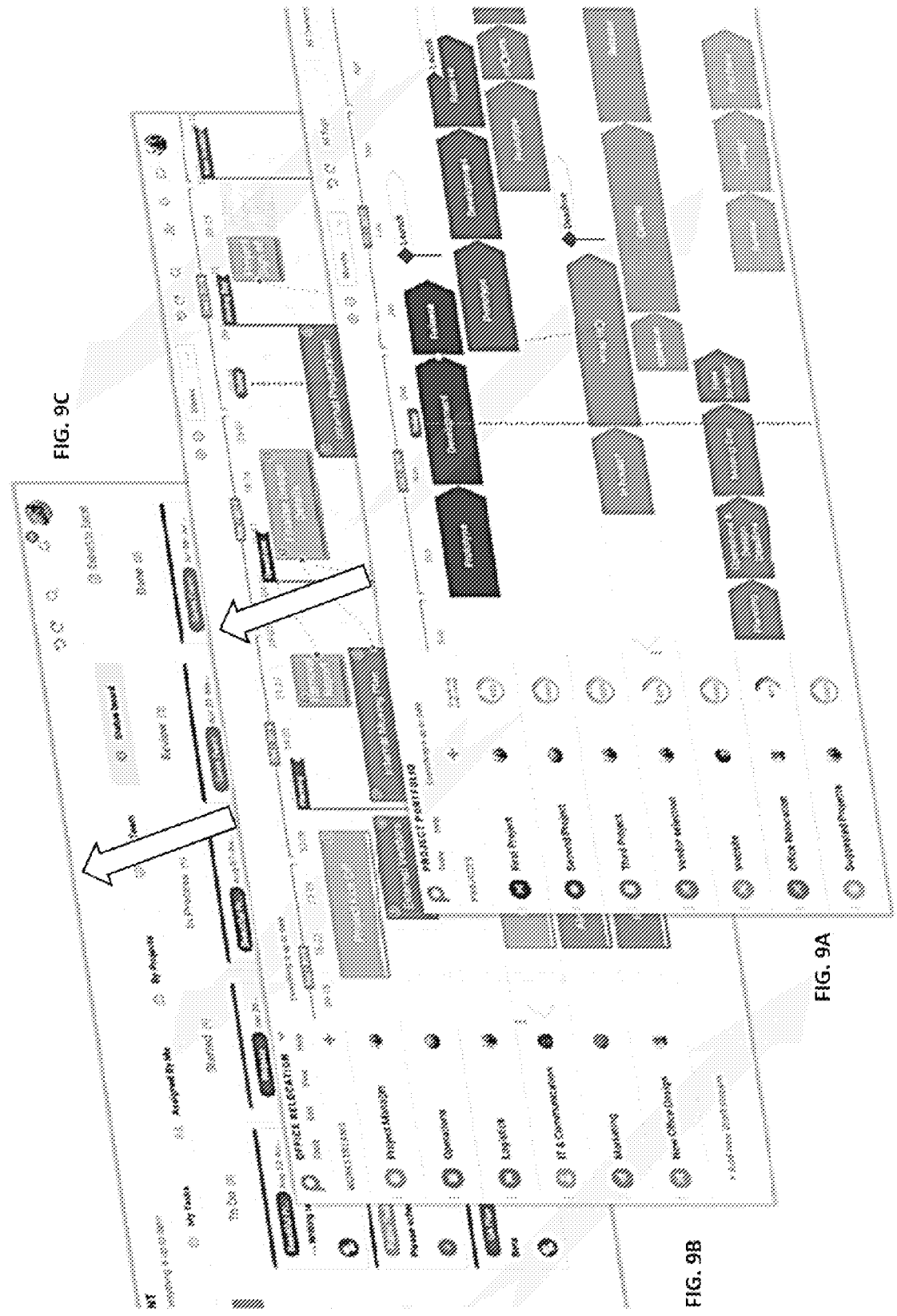

FIG. 11

SYSTEMS AND PROGRAMS FOR PROJECT PORTFOLIO MANAGEMENT

CROSS REFERENCE TO RELATED APPLICATIONS

This patent application is a Continuation-in-part of commonly owned and pending U.S. application Ser. No. 16/084,539 filed Sep. 12, 2018, which is a National Phase filing of PCT Application No. PCT/IL2017/050292, filed Mar. 8, 2017, claiming priority from U.S. Provisional Patent Application No. 62/307,601, filed Mar. 14, 2016, all which are incorporated herein by reference in their entirety.

COPYRIGHT NOTICE

A portion of the disclosure herein below contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND

The disclosure is directed to systems, methods and computer readable media for managing, analyzing and displaying project portfolios and their various interdependencies. More specifically, the disclosure is directed to systems, methods and computer readable media for analyzing critical workstream data which connection with other workstreams in the same or other projects affect coordination and other milestones, and displaying project portfolios and their various interdependencies, rather than using a task-specific Gantt chart.

More and more projects follow Agile methodologies these days. In such project the traditional task chain does not exist, with multiple tasks having the same duration occurring simultaneously ("sprints"), thus prioritizing timing over content. For these kind of projects, typical critical chain project management, Waterfall-style, is not effective, since true risk is not identifiable with critical chain analysis presented using for example, Gantt charts, which prioritize content over timing.

An "Agile" project management typically involves a lightweight and less restrictive (fewer rules, less documentation, etc.) way of development project and/or operations projects referred to as Agile methodologies. Agile methodologies may be viewed in two forms: as an extension of XP; or as a composite of other existing methodologies (lightweight, heavyweight, etc.). Agile methodologies tends to stress, workstreams and interactions over processes and tool, deliverables over comprehensive documentation, customer collaboration over contract negotiation, and responding to change (floating) over following a rigid, Waterfall-style plan.

For example, SCRUM is an Agile lightweight process that can be used to manage and control development projects and operations projects. Wrapping existing engineering practices, including Extreme Programming and Lean project management, Scrum generates the benefits of agile development with the advantages of a simple implementation. Scrum significantly increases productivity while facilitating adaptive, empirical systems development. SCRUM utilizes daily meetings and organizes activities into periodic (e.g. 3 weeks) sprints. What many like about SCRUM is that it goes way beyond development. SCRUM is used for any task-oriented project that has ambiguity associated with the way the work should be done.

These and other issues are addressed by the disclosed technology.

SUMMARY

Disclosed, in various embodiments, are systems, methods and computer readable media for analyzing critical workstream data which connection with other workstreams in the same or other projects affect coordination and other milestones, and displaying project portfolios and their various interdependencies, rather than using a task-specific Gantt chart.

In an embodiment provided herein is a system for sharing and analyzing a plurality of workstreams data for project portfolio management (PPM) over a network, comprising: a workstream module; a display module; and a graphical user interface (GUI) module in communication with the workstream module and the display module, providing a GUI to allow user-access to said workstream module, said GUI module comprises a central processing module (CPM) including at least one processor and a non-volatile memory storage device storing thereon a processor-readable media with a set of executable instructions configured, when executed to cause the at least one processor, using the display to simultaneously display: a plurality of project icons, each project icon associated with a project in the project portfolio; a plurality of milestone icons for each of the plurality of projects, wherein each milestone icon is associated with a milestone of the associated project; and a progress indicator for each of the plurality of projects.

In another embodiment, provided herein is an article of manufacture comprising a non-transitory memory storage device having a computer readable medium (CRM) therein for project portfolio management, the CRM comprising a set of executable instructions configured to, when executed by at least one processor, cause the at least one processor to perform the steps of: obtaining from a user a plurality of projects associated with a project portfolio; obtaining from the user a plurality of workstreams associated with each project in the project portfolio; obtaining from the user a plurality of milestone for each of the plurality of projects; obtaining from the user a progress indicator for each of the plurality of projects; storing the plurality of projects, the plurality of workstreams and the plurality of milestones on the non-transitory memory device; and using a graphical user interface (GUI) module in communication with a workstream module and a display module included with the article of manufacture, generating and simultaneously displaying a plurality of project icons, each project icon associated with a project in the project portfolio, a plurality of milestone icons for each of the plurality of projects, wherein each milestone icon is associated with a milestone of the associated project, and a progress indicator for each of the plurality of projects.

These and other features of the systems, methods and computer readable media for managing, analyzing and displaying project portfolios and their various interdependencies, will become apparent from the following detailed description when read in conjunction with the figures and examples, which are exemplary, not limiting.

BRIEF DESCRIPTION OF THE FIGURES

For a better understanding of the systems, methods and computer readable media for managing, analyzing and displaying project portfolios and their various interdependencies, reference is made to the accompanying examples and figures, in which:

FIGS. 9A-9C illustrates the "drill down" layered GUI of an exemplary implementation, with FIG. 9A, illustrating the top (projects) layer, FIG. 9B, illustrating sub menu of each project, actuatable from project icons at the top layer with multiple workstreams, and task containers, and FIG. 9C, illustrating sub-sub menu of each task container, actuatable from task containers' icons at the mid layer with multiple tasks;

FIG. 11, illustrating resource management dashboard available in the systems and programs disclosed;

DETAILED DESCRIPTION

Figure 1:
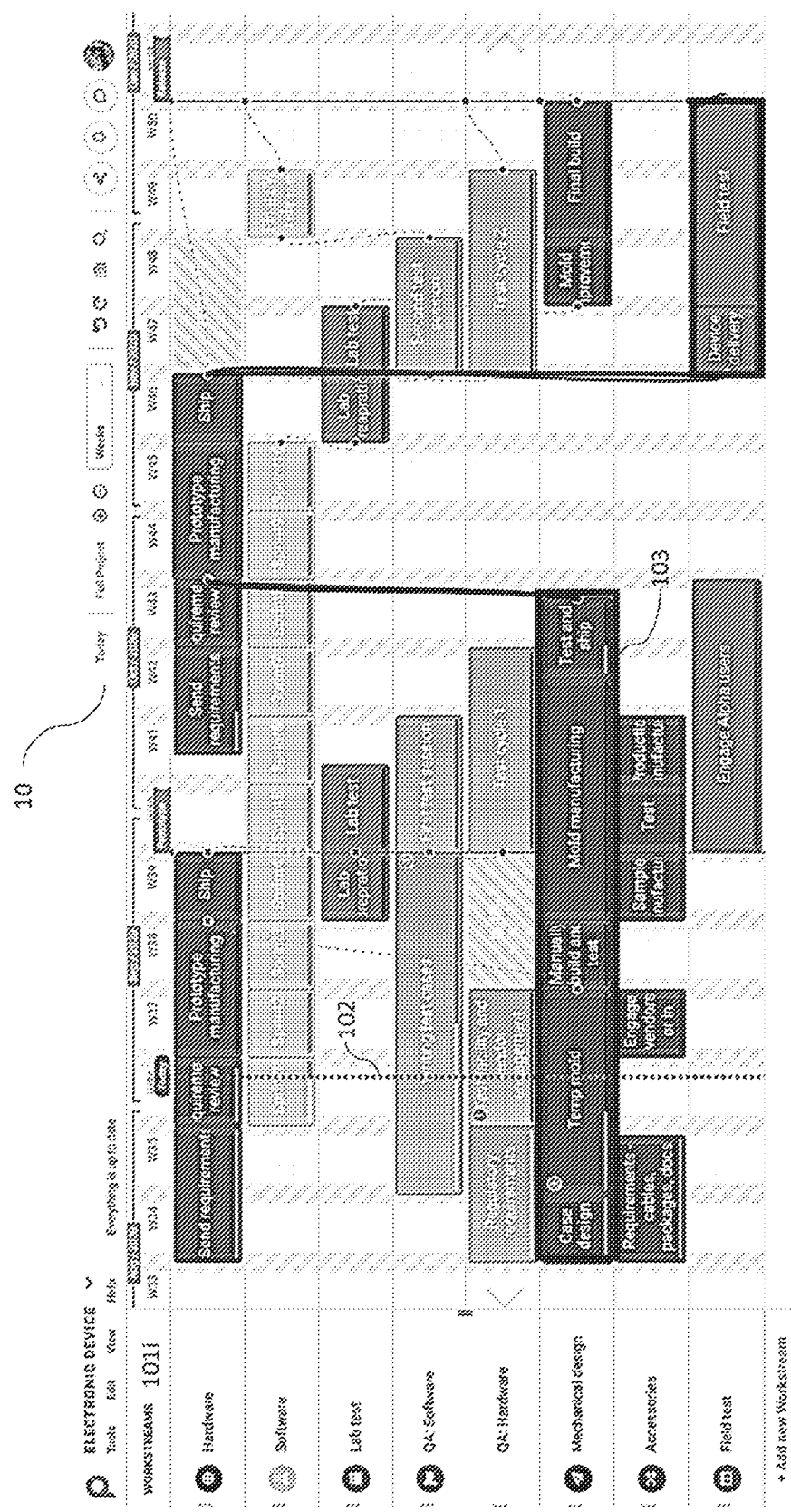
FIG. 1 is a GUI display showing mid layer critical chain of workstreams that is longer, but predictable.

Provided herein are embodiments of systems, methods and computer readable media for managing, analyzing and displaying project portfolios and their various interdependencies. More specifically, provided are systems, methods and computer readable media for analyzing critical workstream data obtained from a user or users in the process of implementing, for example, Agile methodology for product development, which connection with other workstreams in the same or other projects are likely to affect coordination and other milestones, and displaying project portfolios and their various interdependencies, rather than using a task-specific Gantt chart.

In the context of the disclosure, Project Portfolio Management (PPM) means the centralized management used by project managers and other relevant users to analyze and collectively manage multiple current or proposed interdependent projects, based on key characteristics. PPM helps in certain implementations, to implement Agile Methodology, by optimizing resource mix for delivery of a product and scheduling activities to achieve organizations' goals in the most effective and efficient manner. All this is done while analyzing constraints, objectives, and the projects' realization parameters. The PPM tools disclosed herein, can be used to achieve a single goal (in other words, a "program"), or multiple goals of different kinds.

The graphic user interface enabled by the systems, methods and articles of manufacture comprising non-volatile memory storage devices with computer (interchangeable with processor) readable media (CRM), can be used to develop a concise, data dense and unique visual language, in multiple dimensions, allowing for the simultaneous analysis of multiple activity sectors.

In certain exemplary implementations, provided herein is a system and method for dynamically updating and displaying a PPM via a graphical user interface (GUI). The PPM is displayed in a layered configuration according to granularity levels, and according to area of activity or the various activities that are displayed and added (or removed) from the GUI of the PPM plan.

In an exemplary implementation, provided herein is a system and method for collecting data from a plurality of projects to enable automatic analysis of the interdependencies among the projects, extraction of an action plan and risk management. The action plan and risk management are generated and provided in a presentable and user friendly manner. The solution provides for obtaining project related areas of activities, activities and tasks to be performed for completion of the project, critical dependencies, and perceived risk to generate a project analysis. The project analysis enables management of the action plan and an associated risk reduction plan. The action plan and risk reduction plan are managed according to the system and method disclosed herein to provide a complete coverage and risk management of potential project risks and pitfalls, based on the collected data. The system and method enable sharing of the action plan to enable multiple users to provide collected data for providing the most efficient and reliable action plan.

Accordingly and in an exemplary implementation, provided herein is a system for sharing and analyzing a plurality of workstreams data for project portfolio management (PPM) over a network, comprising: a workstream module; a display module; and a graphical user interface (GUI) module in communication with the workstream module and the display module, providing a GUI to allow user-access to said workstream module, said GUI module comprises a central processing module (CPM) including at least one processor and a non-volatile memory storage device storing thereon a processor-readable media with a set of executable instructions configured, when executed to cause the at least one processor, using the display to simultaneously display (see e.g., FIG. 10A): plurality of actionable project icons 101$i$, each actionable project icon 101$i$ associated with a project in project portfolio 10; plurality of actionable milestone icons 1002$j$ for each of the plurality of projects 101$i$, wherein each actionable milestone icon 1002$j$ is associated with a milestone of the associated project 101; and continuous progress indicator 1001$i$ for each of the plurality of projects.

The term "system" shall also be taken to include any collection of systems or sub-systems that individually or jointly execute a set, or multiple sets, of instructions to perform one or more functions. Also, the term "system" refers to a logical assembly arrangement of multiple devices, and is not restricted to an arrangement wherein all of the component devices are in the same housing, or in the same location.

In the context of the disclosure, the term "actionable [X]" is used herein to mean words and/or phrases and or graphics, and/or icons that can be used to trigger one or more actions on the GUI. For example, actionable items (X), may include, but are not limited to, project names, workstreams milestones, task containers or a combination comprising the foregoing. Likewise, in the context of the disclosure, the term "workstream" (or area of activity (AoA)) means a sequence of activities (interchangeable with task container) that are rolled up into the same functional area, location, domain, etc. and represent fundamental element of a project structure provided by a user during the planning process, used to extract a project's coordination plan and structure analysis by separating inner workstream dependencies from cross workstream dependencies. Workstream can also refer to preserved records of the actions and events that may have been taken to generate a project in accordance with at least one of the exemplary implementations. In general, a project may be a combination of an associated workstream and associated data. In at least one exemplary implementation, a project may be generated from a workstream and appropriate source data. Also in the context of the disclosure, the term "container" means an object with goal, duration, dates and owner that require multiple tasks, actions and resources to be completed. Every element within the container is targeted toward achieving the goal, being a part of a larger project scheme. For example, traditionally, a Gantt chart could be used to describe the activity of a single task container, elucidating the limitations of Gantt charts in providing the visualization and analysis tools disclosed herein.

Figure 12:
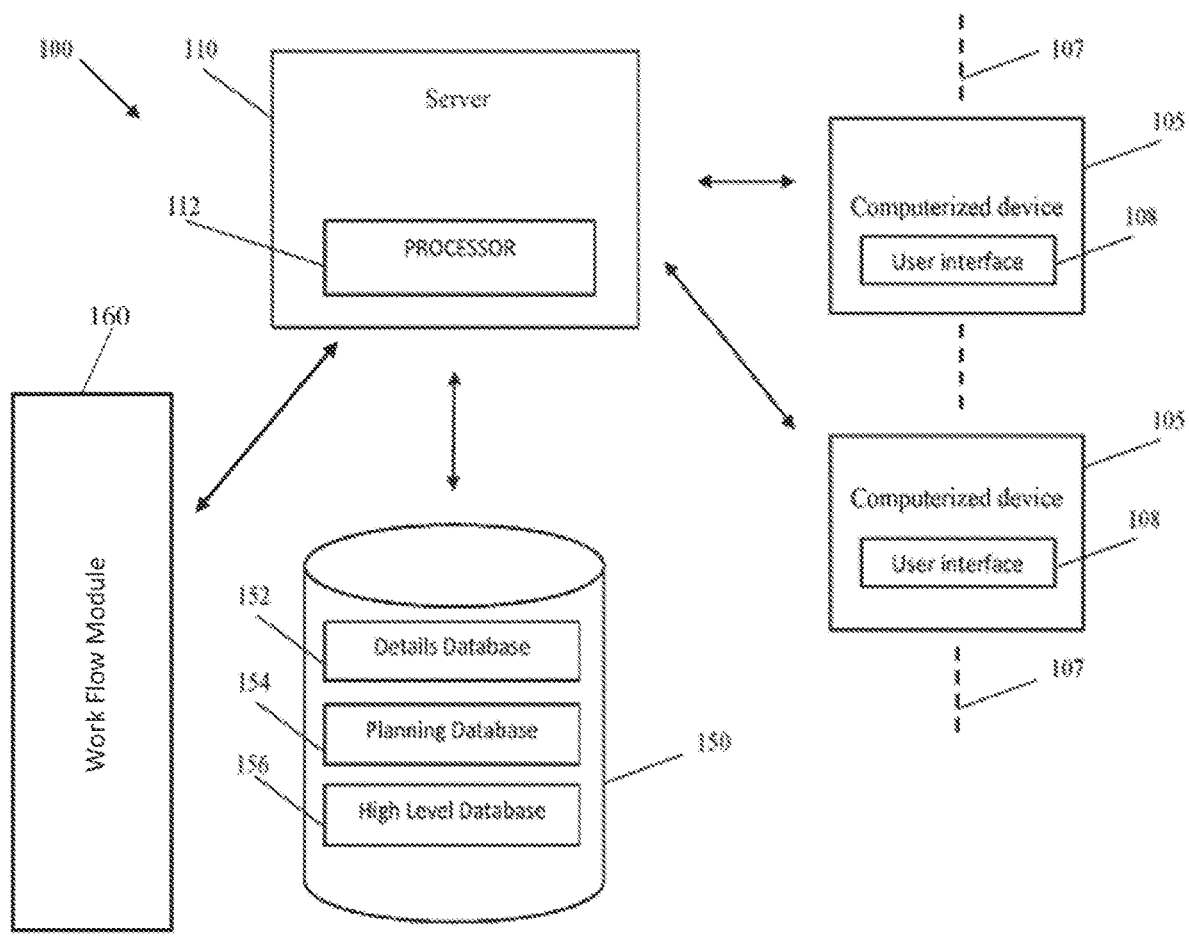
FIG. 12, schematically illustrates an exemplary implementations of a system for generating a PPM plan, a risk reduction plan and related reports.

As shown in FIG. 12, System 100 may comprise one or more user computer device 105, illustrated in FIG. 12 by two user computer devices 105. User computer device 105 may include any number of user computer devices 105 or just one user computer device 105, represented by the dotted lines 107. User computer device 105 may obtain data used to generate the PPM plan from a user. In certain exemplary implementations, user computer device 105 may be a smartphone, tablet, laptop, desktop, or the like. User computer device 105 may comprise a graphical user interface (GUI) 108, which may provide a user of user computer device 105 an interface via which a user may create a project plan, for example by entering data used by computer device 105 to analyze a selected project action plan, project risk reduction plan, and related reports, and via which information is displayed to the user(s). User computer device 105 may communicate with PPM server 110, either wired or wirelessly. PPM server 110 may include or communicate with at least one hardware processor 112, which may execute various modules, e.g. software components including machine code instructions, in order to generate a PPM plan according to data obtained from user(s) computer(s) device(s) 105. For example, processor 112 may execute any of the following modules: a "Project Plan" module, "Action Plan" module, "Risk Reduction Plan" module, "Resources Analysis" module, "Budget Calculation" module, a "Setup and Configuration" module, or any other module that may enable processing of data and generating a thorough and easy to understand PPM plan presentation (e.g., through the GUI). In certain exemplary implementations, PPM server 110 may include, control and/or communicate with a database 150, which may store the data related to the plurality of projects created by users, e.g., workstreams, links between workstreams, milestones, task containers, etc.

Additional modules that can be included in the systems supported by the CRM provided can be, for example; "Project Prioritization Module" and "Project Lifecycle Management Module". In the context of the disclosure, the "Project Prioritization Module" included in the systems disclosed, is operable to generate project priority score and create project portfolio rankings, based on user defined weighted business drivers (e.g., time to market (TTM), penetration, market share, EBITDA and the like), where each one have several graded impact statements and weighting. Likewise, in the context of the disclosure, "Project Lifecycle Management Module" included in the systems disclosed, is operable to define the project lifecycle stages, and the workflow required to move a project (or sub-project in certain implementations) from stage to stage, with required documents, tasks, actions and responsibilities list, for example, approval criteria and personnel.

According to certain exemplary implementations, at least one processor 112 may execute a code comprising instructions for generating PPM plan, and the code instructions may cause the at least one processor to carry out the methods' steps disclosed. The at least one "processor" can include, but is not necessarily being limited to, an instruction execution system such as a computer/processor based system, an Application Specific Integrated Circuit (ASIC), a computing device, or a hardware and/or software system that can fetch or obtain the logic from a non-transitory storage medium or a non-transitory computer-readable storage medium and execute the instructions contained therein. The at least one processor can also include any controller, state-machine, microprocessor, or any other analogue, digital and/or mechanical implementation thereof. In addition, the computer program (software and/or firmware), can comprise program code means for carrying out the steps of the methods described herein, as well as a computer program product comprising program code means stored on a medium that can be read by a computer, such as a hard disk, CD-ROM, DVD, USB memory stick, or a storage medium that can be accessed via a data network, and may contain secured data sought to be incorporated into the PPM plan or its display.

According to some embodiments, database 150 may be divided to or may comprise more than one database, such that each Layer of detail (see e.g., FIGS. 9A-9C) of the PPM plan may be linked to its respective database. For example, the most detailed Layer of the PPM plan, e.g., the Layer called 'Details' may be linked to a respective database 152 called 'Details database' and be associated with the plurality contents and their breakdown of an isolated task container (see e.g., FIG. 9C, 10C), showing synchronization with workflow tools (e.g., JIRA™, SLACK™, AIRTABLE™ and the like), assigned resources, timelines and categorical progress indicator in a detailed layer dashboard.

Similarly, the medium granularity PPM layer (see e.g., FIG. 9B, 10B), called 'Planning' may be linked to a respective database 154 called 'Planning database', and be associated with plurality of workstreams, task containers and progress indicators in a Project Layer sub-menu dashboard. The project management Layer of smallest granularity, or highest Layer from which the sub menus are accessed is called in certain exemplary implementations 'High Layer' (see e.g., FIG. 9A, 10A), and may be linked to a respective database 156 called 'High Layer database', and be associated with plurality of projects, milestones and progress indicators in a dashboard.

During operation, processor 112 may receive via GUI 108 an indication regarding a selected project management granularity to be updated (see pseudocode herein), wherein the granularity (in other word, the resolution layer for the various elements displayed) may be selected from at least three different layers of detail (e.g., 'Details', 'Planning', and 'High Layer' (e.g., FIGS. 9C-9A) presented to the user by GUI 108. Processor 112 may further receive a command via GUI 108 to add at least one activity in a time-slot in the indicated granularity, which may be part of the entire PPM plan. Furthermore, the at least one added activity may be stored in a database associated with the indicated granularity (for example, if the selected layer is of medium granularity, e.g., 'Planning' layer, then the respective database would be Planning database 154). GUI 108 may then display the project management plan in a layered configuration, such that each layer of display may denote one of the layers of detail, according to areas of activity along a timeline. That is, GUI 108 may display the added at least one activity in the layer corresponding to the indicated granularity (e.g., Planning layer, though any other granularity may be applied, see e.g., FIGS. 7, 8).

In certain implementations, the actionable icons of selectable projects rendered by the systems and programs disclosed in the 'High Layer' will enable a user to access 'Mid Layer' sub-menu, and actionable icons of workstreams, or task containers will enable a user to access 'Detailed Layer' display. Accordingly, and in an exemplary implementation, each of the displayed actionable project icons (see e.g., 101i, FIG. 10A) is operable to open a sub-menu associated with a selectable, specific project, the specific project sub menu operable to be displayed upon selection of the specific actionable project icon from the plurality of actionable project icons displayed by the GUI in the high-level layer. Upon selection of the specific project sub menu (see e.g., FIG. 10B) using the actionable project icon 101i displayed, the set of executable instructions are configured, when executed to cause the at least one processor 112, using display (e.g., user interface 108) to simultaneously display, on selected project sub-menu: plurality of workstream icons 102q, each actionable workstream icon 102q, associated with a corresponding workstream (e.g., area of activity); plurality of actionable task icons 1020q, each actionable task icon 1020q associated with a corresponding task container 1022l; and for each task container 1022l, continuous progress indicator 1025q. Also illustrated in FIG. 10B, are cross task containers and cross workstreams interdependencies 1023m.

An exemplary pseudocode used in certain exemplary implementations, to create a coordination plan, by focusing on cross-Workstream connections and interdependencies is provided below:

```
export const getProjectCoordinationPlan = {
const project = await models.project.findFullProjects({
    projectId,
    categoryId: null,
    full: true,
    type: 'public'
});
srcProject.activities.map(activity => {
    if (activity.connectors.length) {
        activity.connectors.forEach((con) => {
            const connector = find((item) => item.id === con)(srcProject.activities);
            if (connector) {
                const slack = moment(connector.date.start).diff(moment(activity.date.end), 'd');
                plan.push({
                    id: `${activity.id}_${con}`,
                    from: activity.label,
                    finish: moment(activity.date.end).format('MMM DD'),
                    to: connector.label,
                    start: moment(connector.date.start).format('MMM DD'),
                    status: null,
                    action: null,
                    active: true,
                    slack: slack + 'd'
                });
            }
        });
    }
});
}
```

In an exemplary implementation, each of the displayed actionable workstream icons 102q displayed using the GUI 108 as rendered by the CRM disclosed herein, is operable as a sub-menu associated with a selectable, specific workstream, the specific workstream sub menu operable to be displayed upon selection of the specific actionable workstream icon from the plurality of actionable workstream icons. Accordingly, as illustrated e.g., in FIG. 10B, upon selection of the specific workstream sub menu, by selecting the appropriate actionable workstream icon 102q, the set of executable instructions are configured, when executed to cause at least one processor 112, using the display 108 to simultaneously display as illustrated in FIG. 10C, on selected workstream sub-menu (e.g., 'epics: Backend Team'): plurality of deliverables 1031n, each deliverable associated with task container 1020q; indicator 1032n associated with at least one of: a resource, and a sprint; plurality of timeline indicators 1033n, each timeline indicator associated with a corresponding deliverable 1031n; and plurality of categorical (as opposed to continuous) progress indicators 1034n, each progress indicator 1034n associated with the corresponding deliverable 1031n.

Figure 2:
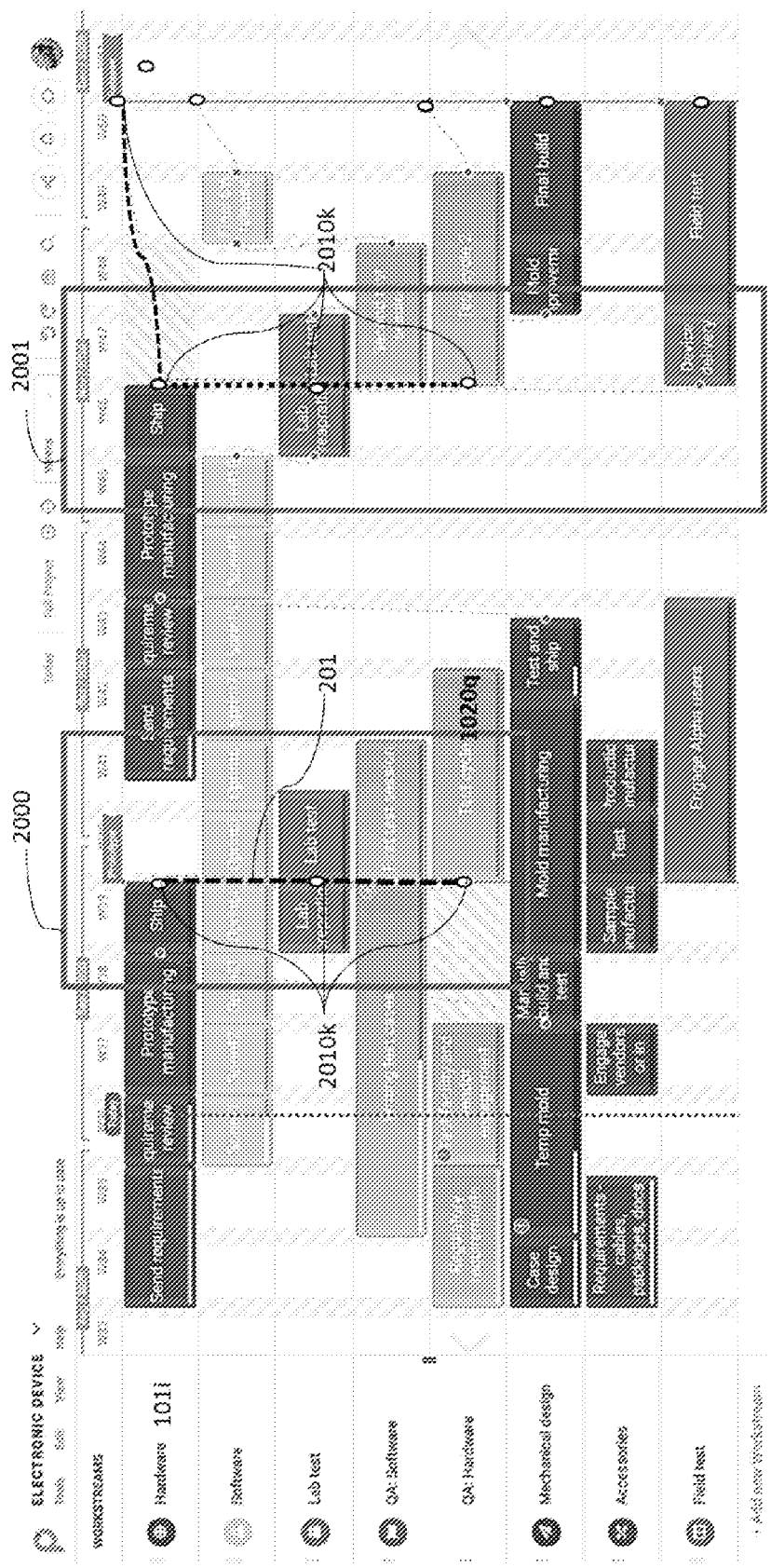
FIG. 2, is a GUI display showing mid layer critical cluster of task containers across several workstreams identifying the real risk in completion of the project as analyzed by the system.

In certain embodiment, each layer, once accessed using the actionable icons provided, can be updated at the layer level, which will automatically update the preceding and/or sequential layer(s). An example of pseudocode used by the systems provided, implementing certain implementations of the CRM disclosed for updating upper (project) layer based on progress in lower layer task containers' mid layer sub menu for the activity progress based on contained tasks progress 1025q (see e.g., FIG. 10B).

dependencies 2010k, constrains and risk factors (resources, slack, communication, engagement, costs, delivery impact) around a specific activity (e.g., hardware shipping) in electronic device project plan. Analyzing each activity as a cluster, using machine learning e.g., as illustrated in FIG. 2, enables in certain implementations, ranking the activity risk potential within a selected project plan, and hence move more focus (e.g., resources) to it (as previously done for critical chains as illustrated in FIG. 1).

In an exemplary implementation, the systems disclosed using the CRM implemented further comprising a workflow management module 160 (see e.g., FIG. 12) in bidirectional communication with the GUI module (e.g., via CPM), the workflow management module comprising a workflow database with data associated with at least one of: the milestones,

```
IF NOT activity_list IS NULL THEN
    FOREACH activity IN ARRAY activity_list
    loop
        SELECT sp_get_status_excluded((activity->>'status')::int, stats) into isExcluded;
        IF NOT isExcluded then
            startDateSubString := substring(activity->>'start_date' from 0 for 11);
            endDateSubString := substring(activity->>'end_date' from 0 for 11);
            startDate := to_date(startDateSubString, 'YYYY-MM-DD');
            endDate := to_date(endDateSubString, 'YYYY-MM-DD');
            SELECT sp_calculate_working_days(startDate, endDate, days_meta, firstDayOfWeek,
weekWorkingDays) INTO days;
            totalWorkDone = totalWorkDone + (activity->>'progress')::float / 100 * days;
            totalWork = totalWork + days;
        END IF;
    END LOOP;
    RETURN ((totalWorkDone / totalWork) * 100)::integer;
END IF;
```

40

In certain exemplary implementations, the set of executable instructions implemented in the systems disclosed, are configured, when executed to cause the at least one processor, to perform the steps of: using machine learning analyzing at least one of: critical clusters 2000, 2001 of task containers 1020q (see e.g., FIG. 2), and critical risks of critical clusters: and displaying the at least one of: the critical clusters, and the critical risks. In the context of the disclosure, "cluster" (e.g., 2001, FIG. 2) means a network of the task containers, and the deliverables. Accordingly, and in another exemplary implementation, the set of executable instructions (included in the CRM) are configured, when executed to cause at least one processor 112, to perform the steps of: using CPM, synchronizing each of: the milestones, the task containers, and the deliverables with workflow database. An example of a pseudocode used to perform JIRA™, a workflow (and workstream repository) monitoring code and decision tree, is provided below:

```
calculateTracking = (selectedActivity, duedate, epicDD, sprintEndDate, sprintsState) => {
    if (selectedActivity.progress === 100) return 'Completed';
    if (!duedate && !sprintEndDate) return 'Unscheduled';
    let epDD = epicDD;
    if (!epicDD) epDD = selectedActivity.date.end; // if no epic DD use proggio
    // check duedate or sprint date overdue
    const diff = moment( ).diff(moment(duedate || sprintEndDate), 'd');
    if (diff > 0) return 'Overdue';
    if (duedate) {
        const diff = moment(duedate).diff(moment(epDD), 'd');
        if (diff > 0) return 'Off Track';
    }
    if (sprintEndDate) {
        const diff = moment(sprintEndDate).diff(moment(epDD), 'd');
        if (diff > 0) return 'Off Track';
    }
    return 'On Track';
```

In an exemplary implementation, the executable set of instructions implemented in the systems disclosed, are included in the computer readable medium forming a part of the article of manufacture disclosed. Accordingly and in another exemplary implementation, provided herein is an article of manufacture comprising a non-transitory memory storage device having a computer readable medium (CRM) therein for project portfolio management, the CRM comprising a set of executable instructions configured to, when executed by at least one processor, cause the at least one processor to perform the steps of: obtaining from a user a plurality of projects associated with a project portfolio; obtaining from the user a plurality of workstreams associated with each project in the project portfolio; obtaining from the user a plurality of milestone for each of the plurality of projects; obtaining from the user a progress indicator for each of the plurality of projects; storing the plurality of projects, the plurality of workstreams and the plurality of milestones on the non-transitory memory device; and using a graphical user interface (GUI) module in communication with a workstream module and a display module included with the article of manufacture, generating and simultaneously displaying a plurality of project icons, each project icon associated with a project in the project portfolio, a plurality of milestone icons for each of the plurality of projects, wherein each milestone icon is associated with a milestone of the associated project, and a progress indicator for each of the plurality of projects.

Turning now to FIGS. 1 through 12, illustrating in FIG. 1, an example of the GUI display with a longest, predictable path 103. As illustrated, the systems using the CRM disclosed are activities and tasks in context of company project portfolio's "Workstreams", which provide critical data to the CRM. Likewise, connection between workstreams (see e.g., 2010*k*), showing how cross workstream links and interdependencies affect certain deliverables (e.g., delivery of hardware to other workstreams) implying a potential coordination issue, while connection within Workstream (e.g., between task containers) may be less important. Accordingly, and as illustrated in FIG. 2, looking at a complete PPM plan can reveal the "Critical Clusters" 2000, 2001 and thus the real risk to the overall PPM plan. In an exemplary embodiment, using the CRM disclosed and deep machine learning, the system can analyze, identify and render the mission critical clusters for the PPM plan. Providing this project (or PPM plan) risk level and potential actions is done by at least one of: a Visual output (e.g., interdependency line 201), and actionable feedback upon further 'drill down' to higher granularity layers, whether within a single company and across companies as in a joint projects portfolio of strategic partners.

Figure 3A:
FIG. 3A, illustrates a typical Gantt chart showing hyrachical data set, with no roles per level, with FIG. 3B, illustrating an exemplary implementation of the systems and programs disclosed, with a top layer GUI illustrating high density of data showing multiple projects, with layered data set and functional roles.
Figure 3B:
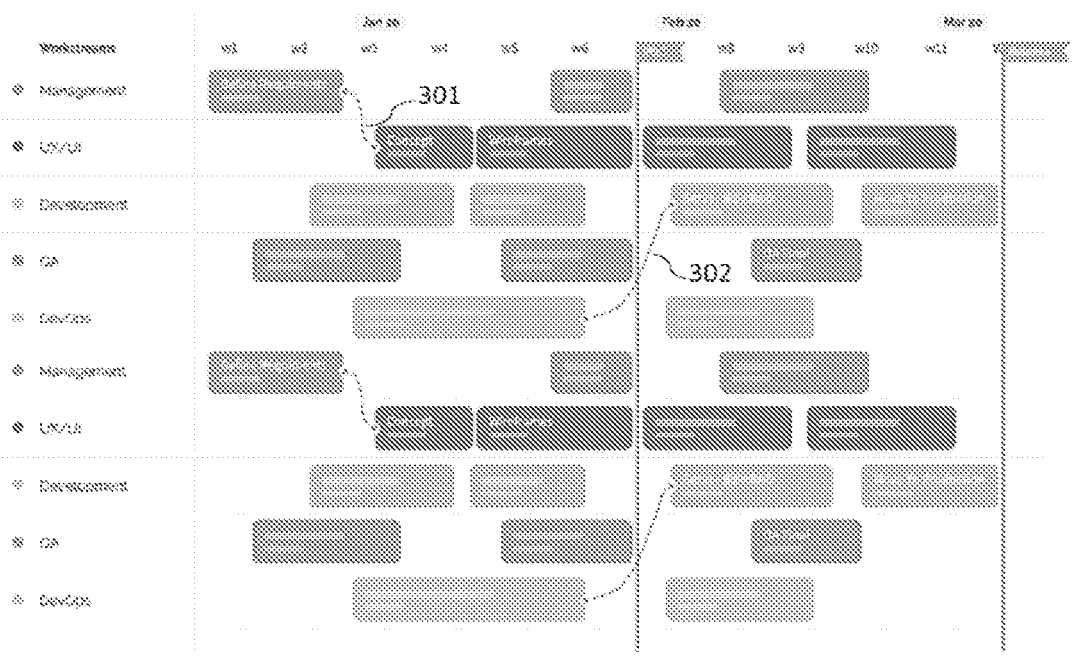

Unlike traditional Gantt charts, illustrated in FIG. 3A, which present a hierarchical data set, without roles, resources or any indication of progress to the date line, the systems, methods and CRM implemented therein provide (e.g., in FIG. 3B) a visually intuitive layered (e.g., via actionable icons) data set with functional roles of projects at the top layer, workstreams in the mid layer and activities/tasks at the highest granularity layer. Similarly, while traditional Gantt charts are analyzed based on critical chain/path, the systems, methods and CRM implemented therein provide analysis of critical clusters of activities (see e.g., FIG. 2).

Figure 4:
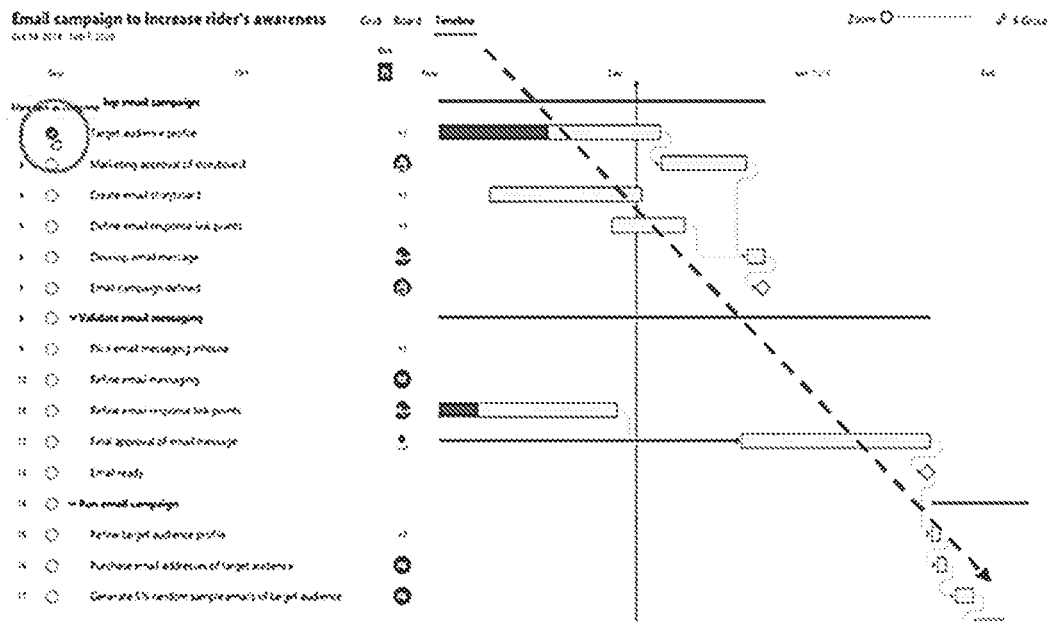
FIG. 4 illustrates an unintuitive typical Gantt chart (as opposed to FIG. 3B), where progress is depicted from top left to bottom right, as opposed to Left-to-Right in a simple block diagram (FIG. 3B)
Figure 5:
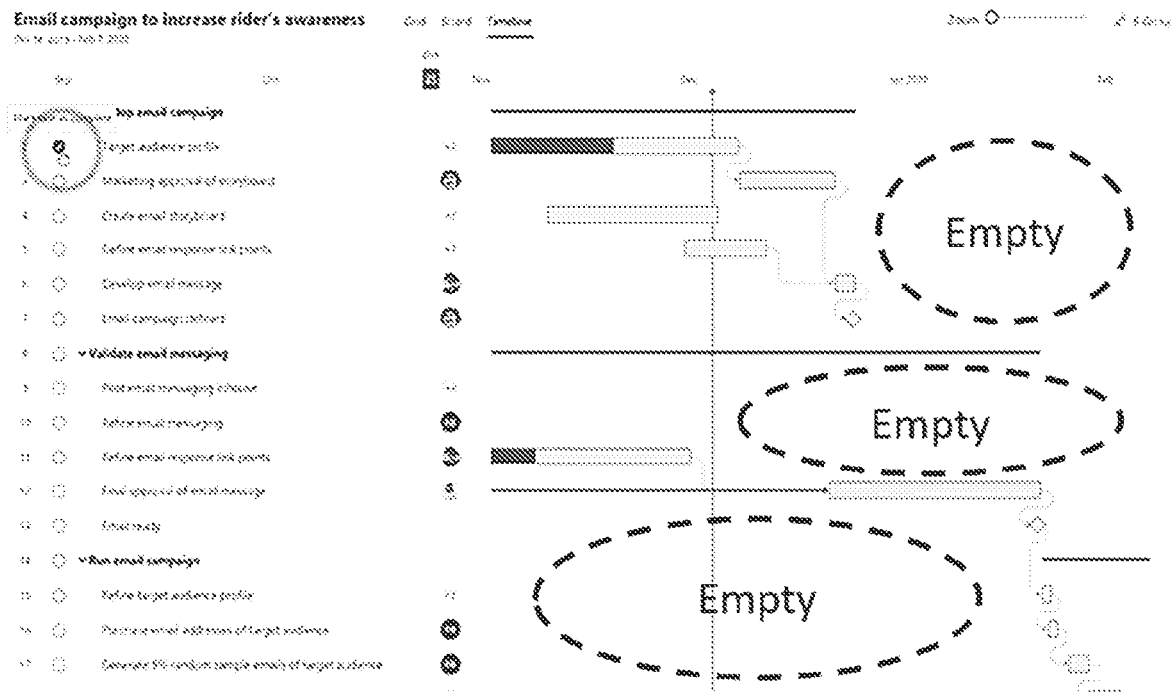
FIG. 5, illustrates an unintuitive typical Gantt chart display of one task per horizontal line and substantial empty space leading to low-density display, as opposed to multiple tasks per line (FIG. 3B) and bidirectional task containers' interdependencies of about 200 task containers.
Figures 6A, 6B:
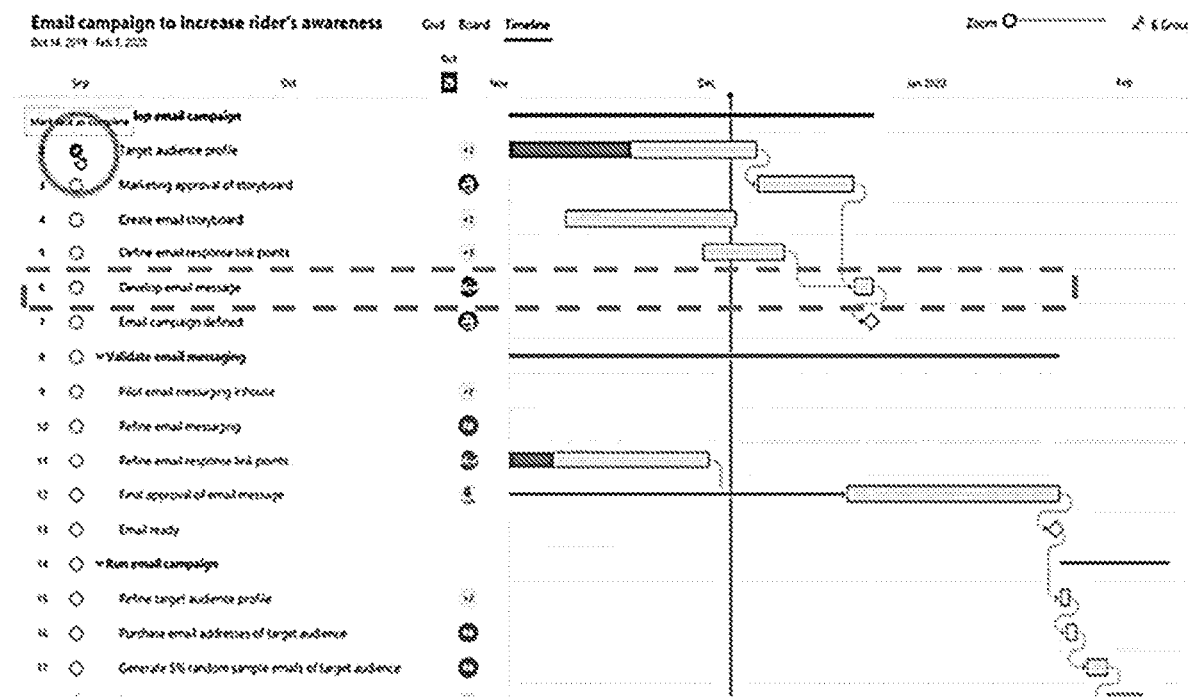
FIG. 6A illustrates an unintuitive typical Gantt chart display of task hierarchy arrangement, as opposed to arrangement in work-streams as illustrated in FIG. 6B.

The visual aspects of the disclosed the systems, methods and CRM implemented therein, as opposed to traditional Gantt chart analysis tools, is further illustrated in FIGS. 4, and 5, where FIG. 4 illustrating a non-intuitive typical Gantt chart (as opposed to FIGS. 2, 3B), where progress is depicted from top left to bottom right, as opposed to Left-to-Right in a simple block diagram (FIG. 3B); and FIG. 5, illustrating typical Gantt chart display of one task per horizontal line and substantial empty space leading to low-density display, as opposed to multiple tasks per line (FIG. 3B) and bidirectional task containers' interdependencies 302 of about 200 task containers, each as an actionable icon that could lead to an even higher granularity. Likewise, FIG. 6A, illustrating typical Gantt chart display of task hierarchy arrangement, as opposed to arrangement in workstreams as illustrated in FIG. 6B, again, where each workstream is an actionable icon allowing for 'drill down' to a higher granularity layer, with interdependencies 601 input e.g., by users and later in supervised learning by machine learning data sets, analyzed and clearly displayed in a bidirectional manner across various workstream.

Figure 7:
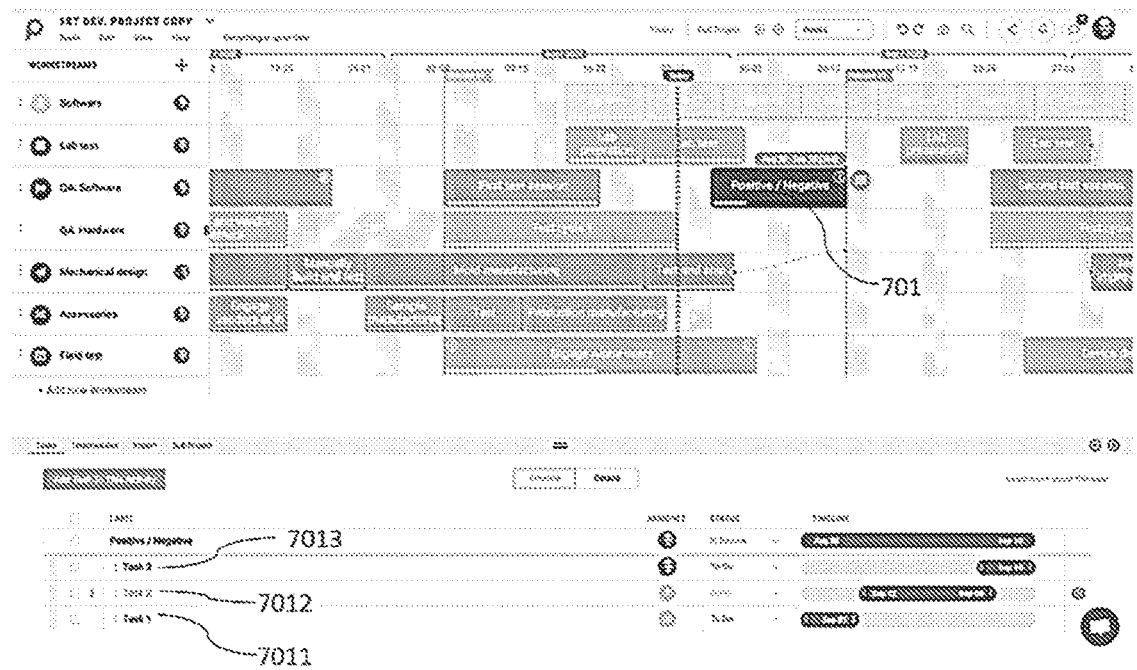
FIG. 7, illustrates an exemplary implementation of the systems and programs disclosed, providing an isolation GUI display of a single task container [Positive/Negative] breakdown (bottom) as a Gantt chart, as opposed to a typical Gantt chart "Waterfall" configuration (as illustrated in FIG. 3A)
Figure 8:
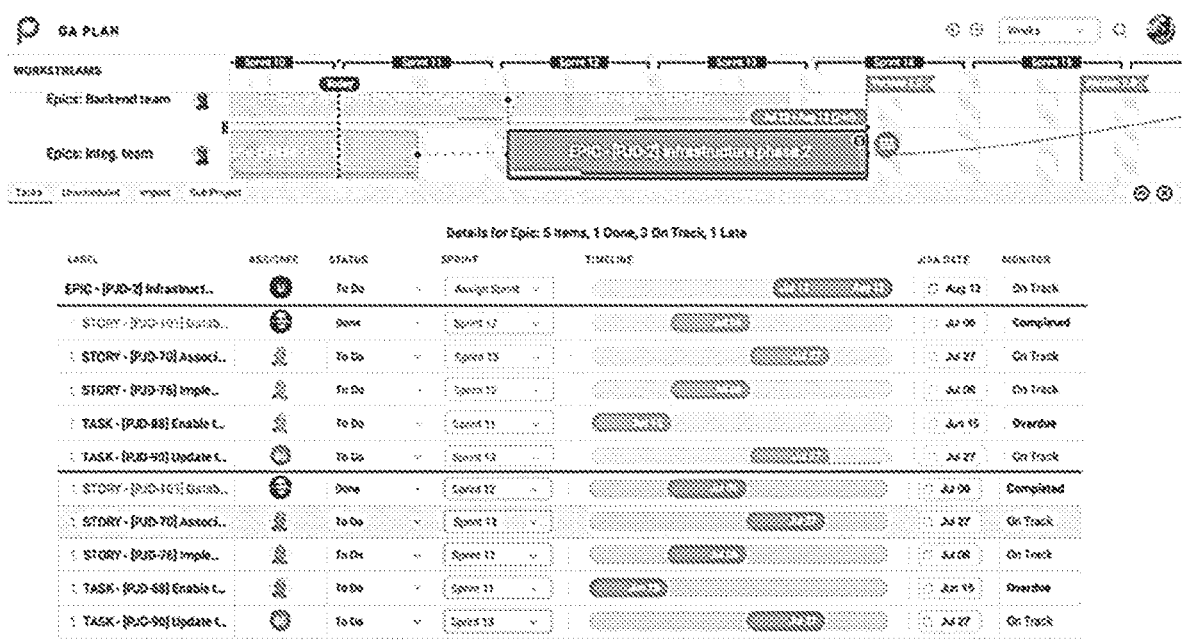
FIG. 8, illustrates another exemplary implementation of the systems and programs disclosed, providing an isolation GUI display of a single task container [Positive/Negative] content in a top-down dynamic configuration, ready for Agile methodology integration, as opposed to a typical Gantt chart with rigid parent-child hierarchy (as illustrated in FIG. 3A)

Turning now to FIG. 7, illustrating the result of actuating an isolation GUI display of a single actionable task container icon [Positive/Negative] and the resulting breakdown (bottom) as a Gantt chart, as opposed to a typical Gantt chart "Waterfall" configuration (as illustrated in FIG. 3A). As indicated, in Agile methodology, the emphasis is on multiple tasks (within the same container) having the same overall duration occurring simultaneously ("sprints"), thus prioritizing overall timing over content. An example would be in the development of a plurality of games for a new game console. Similarly, and as illustrated in FIG. 8, a single task container [Positive/Negative] content is illustrated in a top-down dynamic configuration, ready for Agile methodology integration, as opposed to a typical Gantt chart with rigid parent-child hierarchy (as illustrated in FIG. 3A).

As illustrated in FIGS. 1-8, the visual GUI display provides 1 connection type (finish-to-start), which allow connections only in the activity layer (see e.g., FIG. 8) with floating (in other words the ratio between the time allotted for the specific deliverable and the time allotted for the whole task container), as set by the user, or determined by the machine learning process, and a Start-to-start and finish-to-finish relationships between task containers and underlying tasks where tasks are limited to activity duration. As illustrated graphically in FIGS. 7, and 8, the systems and CRM disclosed allow for input per task container, of the various deliverables and individual tasks to be organized as "floating" within a discrete period. An example for such a task container, defining both the float and the slack (the gap in time between the start/end of a given deliverable and the start/end of the task container, is provided by the following table:

TABLE 1

Task container float and slack

| From the end of | Finish date | To the Start of | Start date | Slack |
|---|---|---|---|---|
| Final build | Dec 28 | Release | Dec 28 | 0 d |
| Test facility and vendor engagement | Sep 28 | Sample manufacturing | Oct 6 | 8 d |
| Ship | Nov 30 | Lab test | Dec 1 | 1 d |
| Ship | Nov 30 | Second test session | Dec 1 | 1 d |
| Ship | Nov 30 | Test cycle 2 | Dec 1 | 1 d |
| Ship | Nov 30 | Device delivery | Dec 1 | 1 d |
| Ship | Nov 30 | Release | Dec 28 | 28 d |
| Lab test | Dec 7 | Mold improvement | Dec 8 | 1 d |
| Second test session | Dec 14 | Final SW release | Dec 15 | 1 d |
| Field test | Dec 28 | Release | Dec 28 | 0 d |
| Test and ship | Nov 7 | Prototype manufacturing | Nov 10 | 3 d |

TABLE 1-continued

Task container float and slack

| From the end of | Finish date | To the Start of | Start date | Slack |
|---|---|---|---|---|
| Test cycle 2 | Dec 21 | Release | Dec 28 | 7 d |
| Engage vendors or in house teams | Sep 28 | Engage Alpha users | Oct 13 | 15 d |
| Test cycle 1 | Nov 2 | Prototype manufacturing | Nov 10 | 8 d |
| Ship | Oct 12 | First test session | Oct 13 | 1 d |
| Ship | Oct 12 | Test cycle 1 | Oct 13 | 1 d |
| Ship | Oct 12 | Lab test | Oct 13 | 1 d |
| Ship | Oct 12 | Prototype | Oct 12 | 0 d |
| Final SW release | Dec 21 | Release | Dec 28 | 7 d |
| Temp mold | Sep 28 | Ship | Oct 6 | 8 d |

As shown, upon input of the deliverables involved for the exemplary implementation, the systems and CRM are each operable to define a task container with a start date of September 28, and an end date of December 28. The systems disclosed are operable in certain exemplary implementations to determine and render the task container along the timeline, as well as provide the actionable icons that will enable the user to access each task/deliverable.

An example of the use of slack in determining the interdependency and links between project is provided in the following pseudocode:

```
projects.map(project => {
    project.activities.forEach(activity => {
        if (activity.listening) {
            activity.listening.forEach(1 => {
                if (projects.map(proj => proj.id).includes(1.fromProjectId)) {
                    const slack = moment(1.toDate).diff(moment(1.fromDate), 'd');
                    const toProject = projects.find(p => p.id === 1.toProjectId);
                    const toActivity = toProject ? toProject.activities.find(ac => ac.id === 1.to) : null;
                    const toCategory = toActivity ? toProject.categories.find(c => c.id === toActivity.category) || { } : { };
                    const fromProject = projects.find(p => p.id === 1.fromProjectId);
                    const fromActivity = fromProject ? fromProject.activities.find(ac => ac.id === 1.from) : null;
                    const fromCategory = fromActivity ? fromProject.categories.find(c => c.id === fromActivity.category) : { };
                    plan.push({
                        id: `${1.from}_${1.to}`,
                        from: `${fromProject ? fromProject.label || " : "}: ${fromActivity.label || ""} (${fromCategory.label || ""})`,
                        finish: moment(1.fromDate).format('MMM DD'),
                        to: `${toProject ? toProject.label || " : "}: ${toActivity.label || ""} (${toCategory.label || ""})`,
                        start: moment(1.toDate).format('MMM DD'),
                        status: null,
                        action: null,
                        active: true,
                        slack: slack + 'd'
                    });
                }
            });
        }
    });
});
```

Turning now to FIGS. 9A-10C, illustrating in FIGS. 9A and 10C, high level preliminary layer, showing plurality of projects 101*i* forming part of PPM plan 10, with continuous progress monitor (here a dial that will be rendered to completion as a portion of user input and occasional update vis synchronization with workflow tools as described) 1001*i* and includes actionable milestone icons clearly marked on the timeline with current date marker 1000 spanning all milestones and finish-to-start interdependency 1003*j* provided between projects.

Figure 10A:
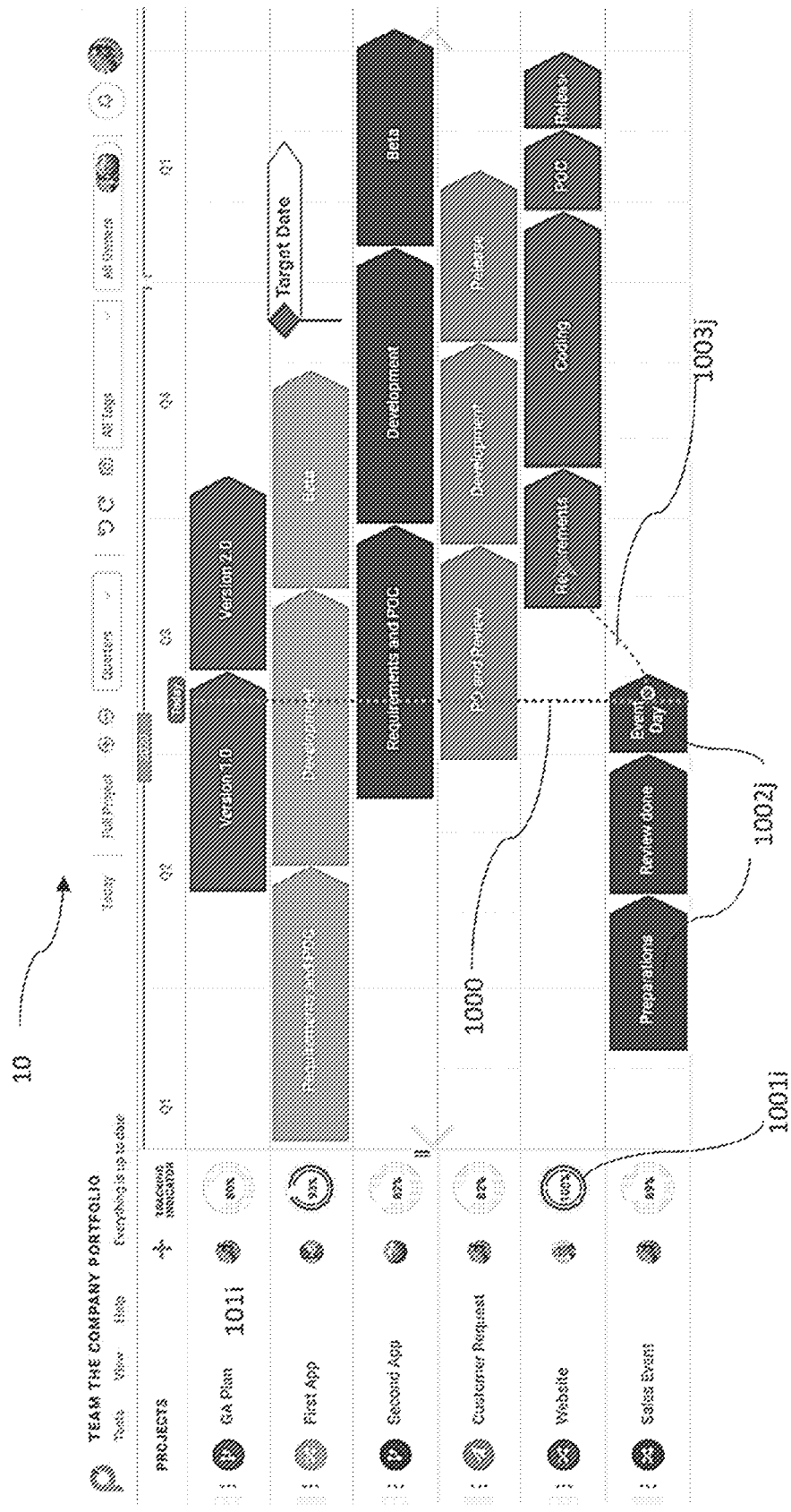
FIG. 10A, is an enlargement of FIG. 9A, illustrating plurality of projects, milestones and progress indicators in a dashboard, with FIG. 10B, illustrating a sub-project menu accessible from the GUI following definition by the user, FIG. 10C, an enlargement of FIG. 9B, illustrating plurality of workstreams, task containers and progress indicators in a Project level sub-menu dashboard, and FIG. 10D, an enlargement of FIG. 9C, illustrating plurality contents and breakdown of an isolated task container, showing synchronization with workflow tools (Jira, e.g.,) assigned resources, timelines and categorical progress indicator in a layer dashboard.
Figure 10B:
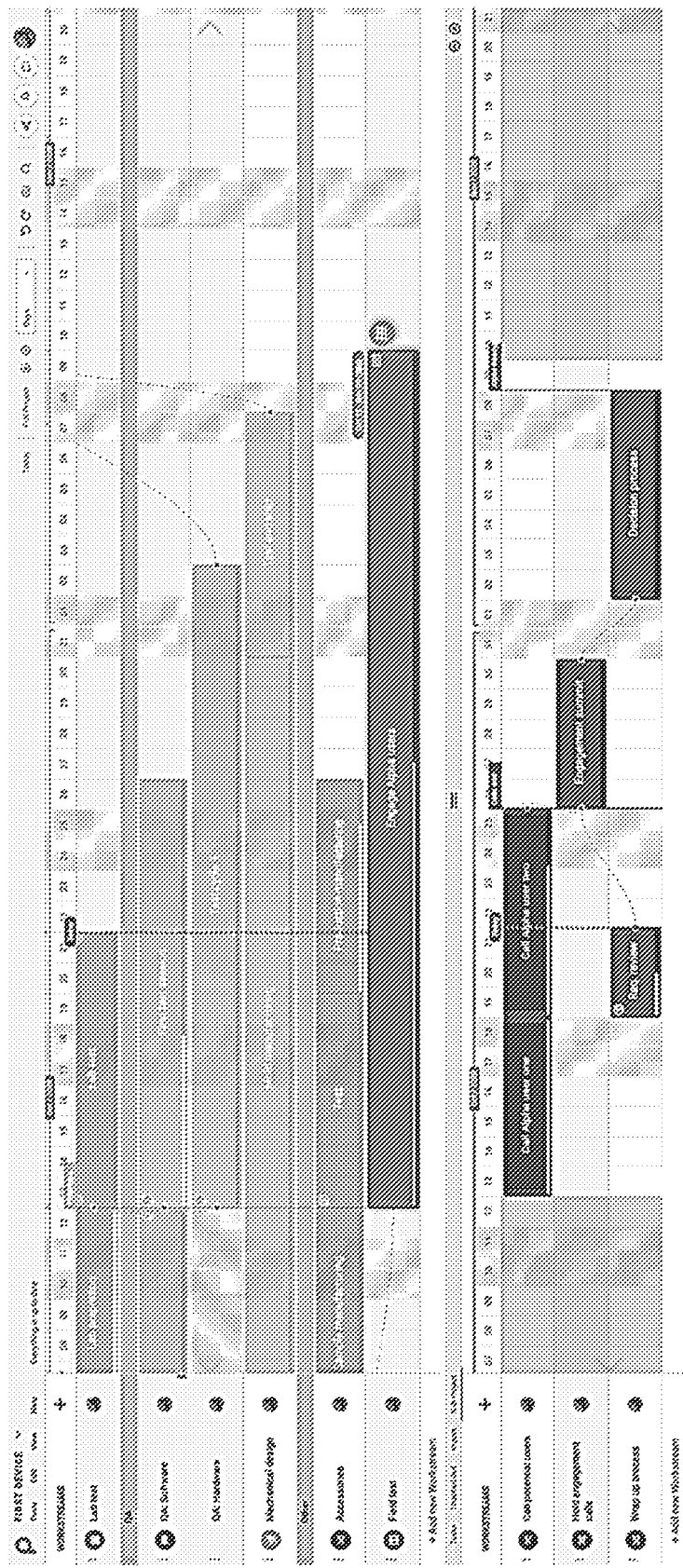
Figure 10:
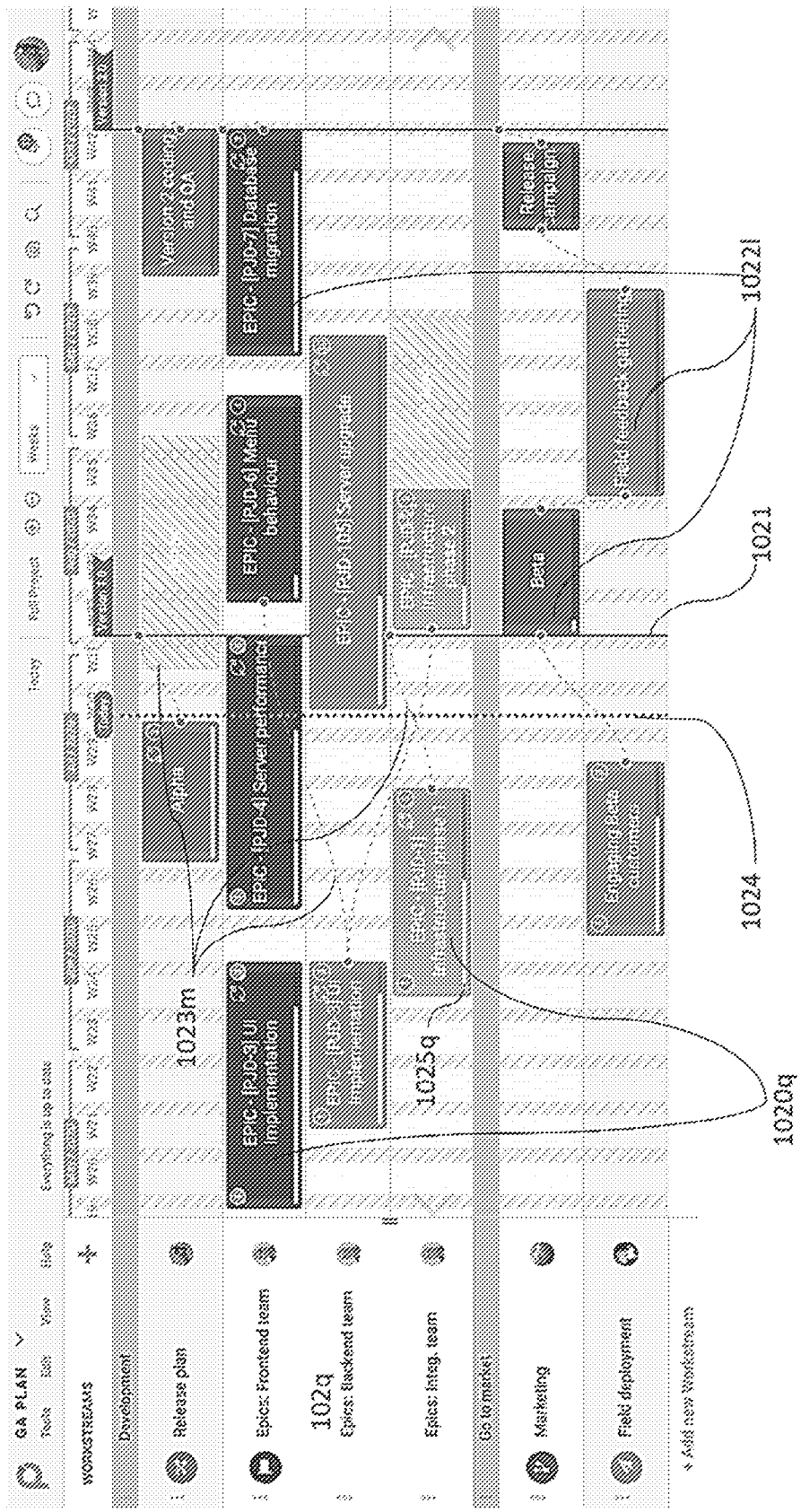

Furthermore, FIGS. 9B and 10C show an exemplary implementation of the mid layer, providing more information on a single project in the portfolio, where plurality of workstreams 102*q* with actionable task containers 1020*q* icons associated with a corresponding task containers (at the next level) 1022*l* and progress indicators 1025*q* are displayed simultaneously in a Project level sub-menu dashboard. Also illustrated are cross workstreams interdependencies 1023*m* that intersecting with critical cluster indicator 1021, or a cross workstreams milestone (see e.g., FIG. 10A), with current date line 1024 providing perspective on the PPM plan progress.

Figure 10D:
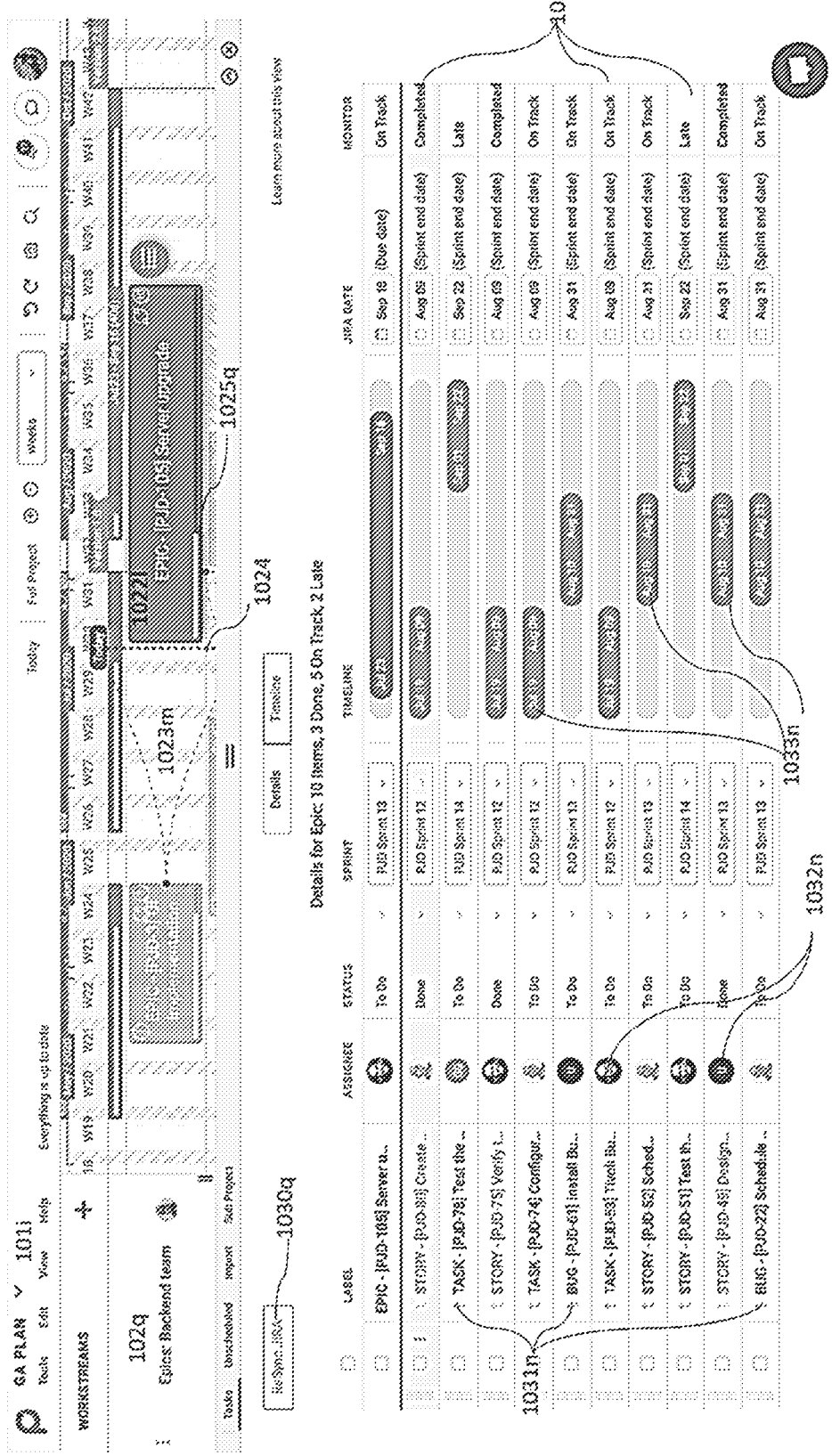

Finally, FIGS. 9C and 10D, show an exemplary implementation of the highest granularity layer, illustrating plurality of task containers' contents in a single workstream 102*q* (here epics Backend team workstream) and breakdown of an isolated task container 1022*l* (here server upgrade), on what appears to be the starting day (see e.g., date line 1024), with continuous progress indicator (bar) which is a function of assigned resources 1032*n*, timelines 1033*n* (again with floating of corresponding deliverables 1031*n* provided by the user(s) and categorical progress indicator 1034*n* in a third layer dashboard, as well as actionable synchronization with workflow tools (Jira, e.g.,) 1030*q* illustrated as well. Deliverable 1031*n* can be assigned as an issues list by the users and while the time to complete the task container is fixed, the interdependency between and among issues are of less importance.

Figure 13:
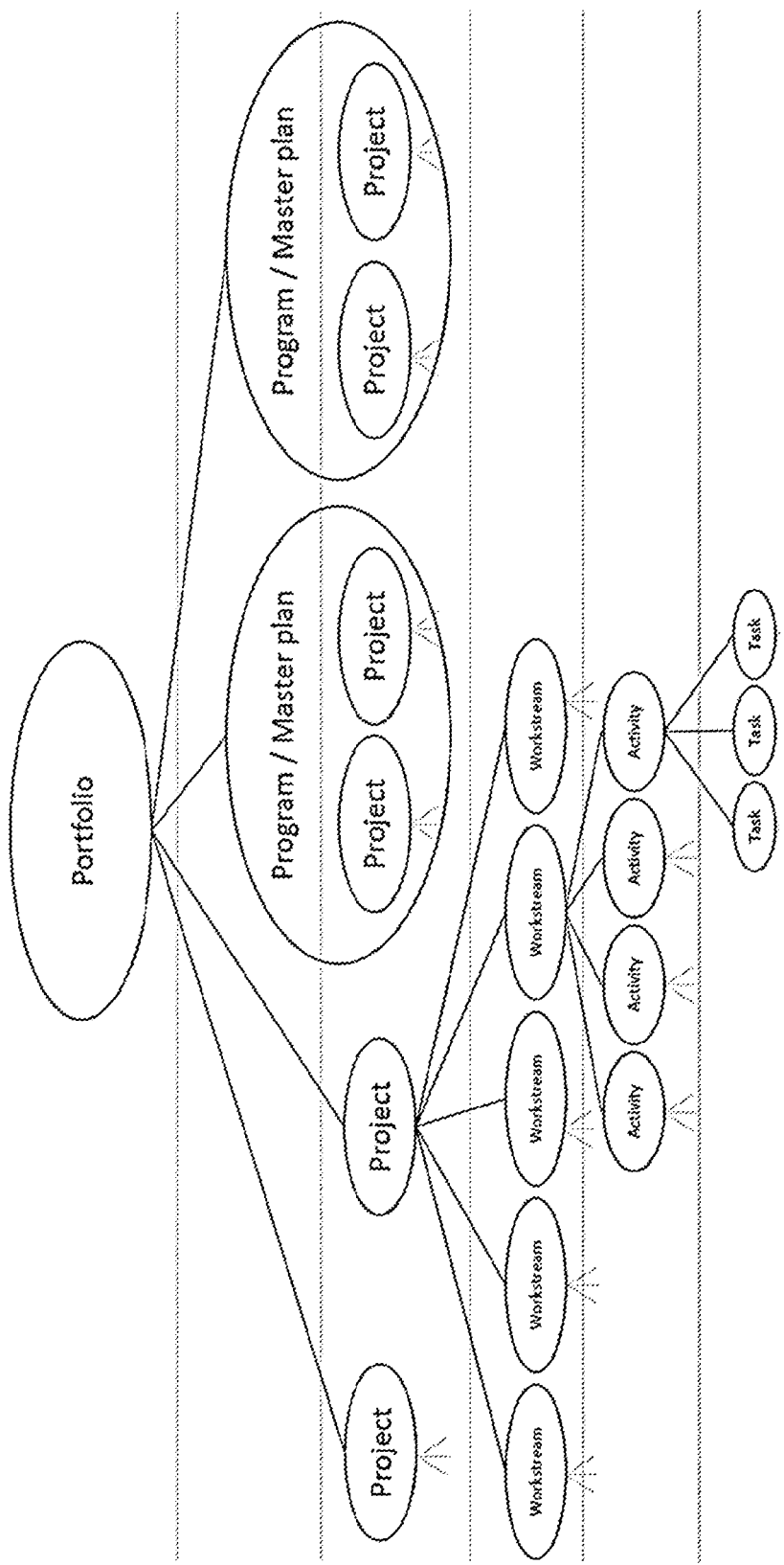
FIG. 13, illustrating the nested groupings accessible by the GUI, providing detailed view of each level as a menu and sib-menu.

Furthermore, FIG. 10B, illustrates sub-project designation, including the appropriate granularity of actionable icons allowing access to a greater level of granularity in a single dashboard, which can provide a mid-level granularity for the project. In general, and as illustrated in FIG. 13, and portfolio of projects, which can be distributed over several corporate divisions, or for that matter across several corporations, joint development consortia, joint ventures and the like, are encompassed by the GUI systems and CRM provided. In certain exemplary implementation, just as with other layers, updating the sub-project level is operable to push the update to lower and higher granularity layers. An example for that update is provided by the following pseudocode:

```
SELECT * FROM activity WHERE CAST(meta->>'subProjectId' AS INT4) =
parentRec.project_id INTO grandParentRec;
IF NOT grandParentRec IS NULL THEN
        OPEN cur_brother_activity (parentId:=parentRec.project_id);
        LOOP
            FETCH cur_brother_activity INTO brothersRec;
            EXIT WHEN NOT FOUND;
            brothers:=brothers || to_jsonb(brothersRec);
        END LOOP;
        CLOSE cur_brother_activity;
        SELECT "firstDayOfWeek", "weekWorkingDays" INTO projectRec FROM project WHERE
active = TRUE AND id = parentRec.project_id;
        SELECT "days_meta" INTO teamRec FROM team WHERE active = TRUE AND id =
parentRec.team_id;
        SELECT sp_calculate_activity_list_progress(brothers, to_jsonb(teamRec. "days_meta"),
projectRec. "firstDayOfWeek", projectRec. "weekWorkingDays", (j->>'statuses')::jsonb) INTO
progress;
     SELECT sp_update_activity_progress_to_number(grandParentRec.id, progress, true) into
changedActivityList;
END IF;
```

Figure 11:
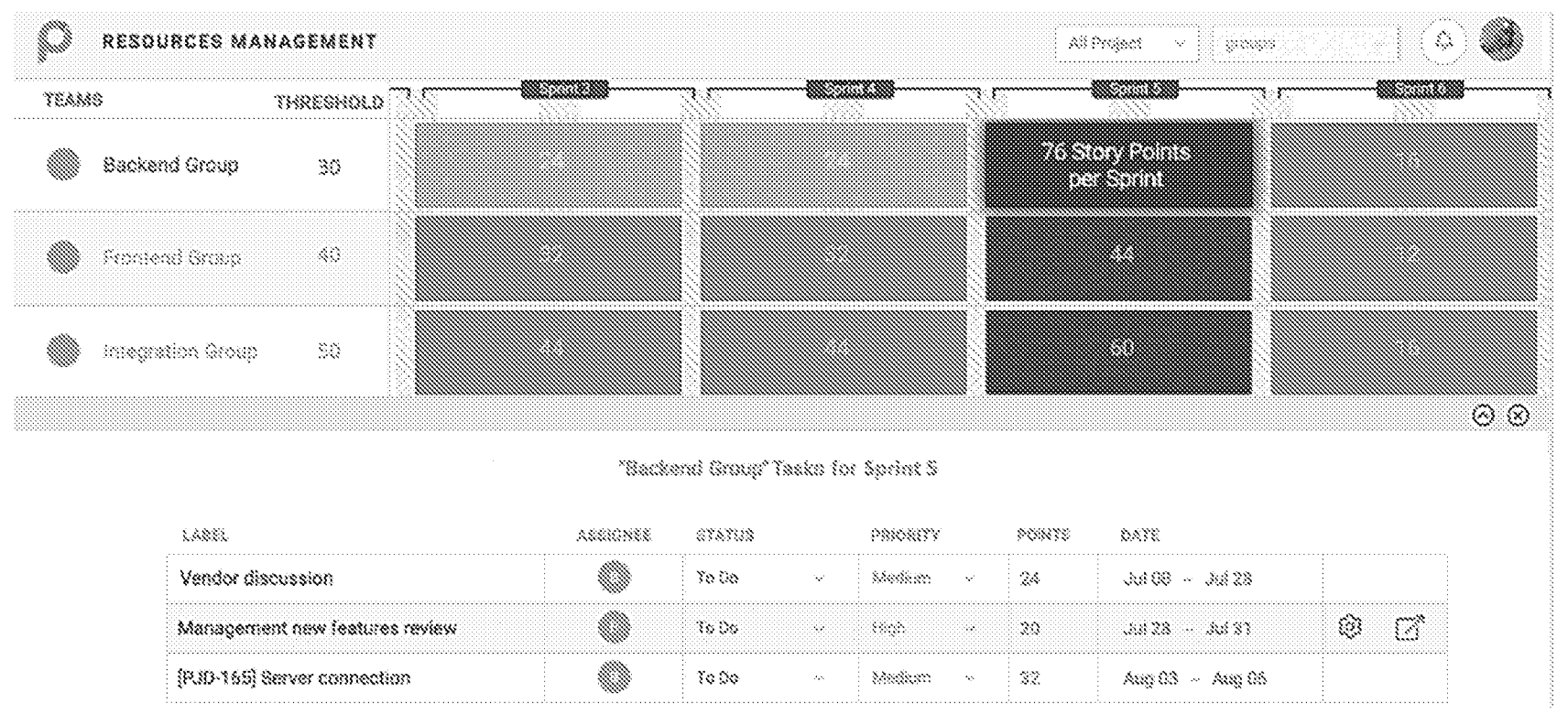

Turning now to FIG. 11, illustrating resource management dashboard available in the systems and programs disclosed, whereby either color coding or light-to dark coloring can be implemented to provide a visual indication of workstreams and various groups can be visually compared by assigning limit value (e.g., 76 Story points per sprint/team=dark/red) and varying other teams/groups workstreams either continuously (256 gray level e.g.,) or categorically (traffic light, green, amber, red) based on predetermined grouping of the Story points per sprint). Other progress parameters can be used to gauge individual/team progress, for example, % loading per week (of available time—Individual), and/or number of deliverables/activities per unite time (e.g., day, week, etc.).

Turning now to FIG. 13, illustrating the various exemplary grouping of projects and their derivatives (e.g., subprojects, master plans, workstreams etc.,) enabled by the systems and CRM used for the implementation of the technology disclosed and claimed.

Memory device(s) as used in the systems, devices and methods described herein can be any of various types of non-transient memory devices or storage devices (in other words, memory devices that do not lose the information thereon in the absence of power). The term "memory device" is intended to encompass an installation medium, e.g., a CD-ROM, floppy disks, or tape device or a non-transient memory such as a magnetic media, e.g., a hard drive, optical storage, or ROM, EPROM, FLASH, etc. The memory device may comprise other types of memory as well, or combinations thereof. In addition, the memory medium may be located in a first computer in which the programs are executed, and/or may be located in a second different computer which connects to the first computer over a network, such as the Internet. In the latter instance, the second computer may further provide program instructions to the first computer for execution. The term "memory device" can also include two or more memory devices which may reside in different locations, e.g., in different computers that are connected over a network.

Additionally, or alternatively, the memory may also be volatile memory. The term volatile memory may be used herein to refer to memory accessed by the at least one processor in order to execute an operating system and/or one or more programs or executables on the device. Volatile memory may refer to and/or may be described as one or more of processor memory, program memory, dynamic memory, RAM, and/or the like. When volatile memory is used for example in the updating of the various layers based on synchronization with workflow tools, the system can be configured to maintain the data stored thereon even when the programmable resource router switches the power off.

Further, the at least one processor may be operably coupled to the various modules and components with appropriate circuitry. may also be used herein, the term(s) "operably coupled to", "coupled to", and/or "coupling" includes direct coupling between items and/or indirect coupling between items via an intervening item (e.g., an item includes, but is not limited to, a component, an element, a circuit, an engine, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

The systems used herein can be computerized systems further comprising a central processing module; a display module; and a user interface module. The Display modules, which can include display elements, may further include any type of element which acts as a display. A typical example is a Liquid Crystal Display (LCD). LCD for example, includes a transparent electrode plate arranged on each side of a liquid crystal. There are however, many other forms of displays, for example OLED displays and Bi-stable displays. New display technologies are also being developed constantly. Therefore, the term display should be interpreted broadly and should not be associated with a single display technology. Also, the display module may be mounted on a printed circuit board (PCB) of an electronic device, arranged within a protective housing and the display module is protected from damage by a glass or plastic plate arranged over the display element and attached to the housing.

The term "module" is used herein to refer to software computer program code and/or any hardware or circuitry utilized to provide the functionality attributed to the module. Further, the term "module" or "component" can also refer to software objects or routines that execute on the computing system. The different components, modules, engines, and services described herein may be implemented as objects or processes that execute on the computing system (e.g., as separate threads).

Unless specifically stated otherwise, as apparent from the following discussions, it is appreciated that throughout the specification discussions utilizing terms such as "processing," "loading," "in communication," "transferring", "receiving", "sending", "detecting," "calculating," "determining", "analyzing," or the like, refer to the action and/or processes of a computer or computing system, or similar electronic computing device, that manipulate and/or transform data represented as physical, such as a transistor architecture into other data similarly represented as physical and structural layers.

As may also be used herein, the terms "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions (in other words, firmware). The at least one processor, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, transient memory, non-transient memory, static memory, dynamic memory, flash memory, cache memory, and/or any device that stores digital information.

Note that if the at least one processor, module, servers, network etc., processing circuit, and/or processing unit includes more than one processing device, the processing devices may be centrally located or may be distributed (e.g., cloud computing via indirect coupling via a local area network and/or a wide area network). Still further it is noted that, the memory element may store, and processor, module, processing circuit, and/or processing unit executes, hard coded and/or operational instructions corresponding to at least some of the steps and/or functions. Such a memory device or memory element can be and is included in an embodiment as an article of manufacture.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

All ranges disclosed herein are inclusive of the endpoints, and the endpoints are independently combinable with each other. "Combination" is inclusive of blends, mixtures, alloys, reaction products, and the like. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the layer(s) includes one or more layer).

Reference throughout the specification to "one exemplary implementation", "another exemplary implementation", "an exemplary implementation", and so forth, when present, means that a particular element (e.g., feature, structure, and/or characteristic) described in connection with the exemplary implementation is included in at least one exemplary implementation described herein, and may or may not be present in other exemplary implementations. In addition, it is to be understood that the described elements may be combined in any suitable manner in the various exemplary implementations.

Likewise, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

In the context of the various implementations, and examples disclosed herein, the term "render" does not make any assumptions as to whether the rendering process is performed by software rendering or by hardware rendering, but rather to produce a 2D graphics image on an output (e.g., display) device.

The term "computer-readable medium" as used herein, in addition to having its ordinary meaning, refers to any medium that participates in providing instructions to at least one processor for execution. Such a medium may take many forms, including but not limited to, non-volatile media and volatile media. Non-volatile media can be, for example, optical or magnetic disks, such as a storage device. Volatile media includes dynamic memory, such as main memory.

Additionally, "user interface module" broadly refers to any visual, graphical, tactile, audible, sensory, or other means of providing information to and/or receiving information from a user or other entity. For example, a set of instructions which enable presenting a graphical user interface (GUI) on a display module to a user for displaying and changing and or inputting data associated with a data object in data fields.

Although the foregoing disclosure has been described in terms of certain exemplary implementations, other embodiments will be apparent to those of ordinary skill in the art from the disclosure herein. Moreover, the described embodiments have been presented by way of example only, and are not intended to limit the scope of the disclosure. Indeed, the novel methods, programs, devices and systems described herein may be embodied in a variety of other forms without departing from the spirit thereof. Accordingly, other combinations, omissions, substitutions and modifications will be apparent to the skilled artisan in view of the disclosure herein.

What is claimed:

1. A system for sharing and analyzing a plurality of workstreams' data for project portfolio management (PPM) over a network, comprising:
   a) a workstream module;
   b) a display module; and
   c) a graphical user interface (GUI) module in communication with the workstream module and the display module, providing a GUI to allow user-access to said workstream module, said GUI module comprises a central processing module (CPM) including at least one processor and a non-volatile memory storage device storing thereon a processor-readable media with a set of executable instructions configured, when executed to cause the at least one processor, using the display to simultaneously display:
   a plurality of actionable project icons, each actionable project icon associated with a project in the project portfolio, wherein each of the displayed actionable project icons is operable as a sub-menu associated with a selectable, specific project, the specific project sub menu operable to be displayed upon actuation of the specific actionable project icon from the plurality of actionable project icons;
   a plurality of actionable milestone icons for each of the plurality of projects, wherein each actionable milestone icon is associated with a milestone of the associated project; and
   a progress indicator for each of the plurality of projects.

2. The system of claim 1, whereupon selection of the specific project sub menu, the set of executable instructions configured, when executed to cause the at least one processor, using the display module to simultaneously display, on selected project sub-menu:
   a) a plurality of actionable workstream icons, each actionable workstream icon associated with a corresponding workstream;
   b) a plurality of actionable task icons, each actionable task icon associated with a corresponding task container; and
   c) for each task container, a progress indicator.

3. The system of claim 2, wherein each of the displayed actionable workstream icons is operable as a sub-menu associated with a selectable, specific workstream, the specific workstream sub menu operable to be displayed upon selection of the specific actionable workstream icon from the plurality of actionable workstream icons.

4. The system of claim 3, whereupon selection of the specific workstream sub menu, the set of executable instructions configured, when executed to cause the at least one processor, using the display to simultaneously display, on selected workstream sub-menu:
   a) a set of deliverables, each deliverable associated with a task container;
   b) an indicator associated with at least one of: a resource, and a sprint;
   c) a plurality of timeline indicators, each timeline indicator associated with a corresponding deliverable; and
   d) a plurality of progress indicators, each progress indicator associated with the corresponding deliverable.

5. The system of claim 4 wherein the set of deliverables are configured to float within time boundaries defined by the associated task container.

6. The system of claim 1, wherein the set of executable instructions configured, when executed to cause the at least one processor, to perform the steps of:
   a) using machine learning analyzing at least one of: critical clusters of task containers, and critical risks of critical clusters: and
   b) displaying the at least one of: the critical clusters, and the critical risks.

7. The system of claim 4, further comprising a workflow management module in communication with the GUI module, the workflow management module comprising a workflow database with data associated with at least one of: the milestones, the task containers, and the deliverables.

8. The system of claim 7, wherein the set of executable instructions configured, when executed to cause the at least one processor, to perform the steps of: using the CPM, synchronizing each of: the milestones, the task containers, and the deliverables with workflow database.

9. The system of claim 1, wherein the set of executable instructions configured, when executed to cause the at least one processor, using the display module, to display an interdependency indicator between or among projects' milestones.

10. The system of claim 2, wherein the set of executable instructions configured, when executed to cause the at least one processor, using the display to display an interdependency indicator between or among workstreams' task containers.

11. An article of manufacture comprising a non-transitory memory storage device having a computer readable medium (CRM) therein for project portfolio management, the CRM comprising a set of executable instructions configured to, when executed by at least one processor, cause the at least one processor to perform the steps of:
   a) obtaining from a user a plurality of projects data associated with a project portfolio;
   b) obtaining from the user a plurality of workstreams data associated with each project in the project portfolio;
   c) obtaining from the user a plurality of milestone for each of the plurality of projects;
   d) obtaining from the user a progress indicator for each of the plurality of projects;
   e) storing the plurality of projects, the plurality of workstreams and the plurality of milestones on the non-transitory memory storage device; and
   f) using a graphical user interface (GUI) module in communication with a workstream module and a display module included with the article of manufacture, generating and simultaneously displaying:
   a plurality of actionable project icons, each actionable project icon associated with a project in the project portfolio, wherein each of the displayed actionable project icons is operable via the CRM as a sub-menu associated with a selectable, specific project, the CRM configured to display the specific project sub menu upon selection of the specific actionable project icon from the plurality of actionable project icons displayed;
   a plurality of actionable milestone icons for each of the plurality of projects, wherein each actionable milestone icon is associated with a milestone of the associated project; and
   a progress indicator for each of the plurality of projects.

12. The CRM of claim 11, whereupon selection of the specific project sub menu, the set of executable instructions configured to, when executed by at least one processor, cause the at least one processor, using the GUI module, to perform the steps of:

a) generating and displaying a plurality of actionable workstream icons, each actionable workstream icon associated with a corresponding workstream;

b) generating and displaying a plurality of actionable task icons, each actionable task icon associated with a corresponding task container; and c) generating and displaying a progress indicator for each task container.

13. The CRM of claim 12, wherein each of the displayed actionable workstream icons is operable via the CRM as a sub-menu associated with a selectable, specific workstream, the CRM configured when executed to display the specific workstream sub menu upon selection of the specific actionable workstream icon from the plurality of actionable workstream icons.

14. The CRM of claim 13, whereupon selection of the specific workstream sub menu, the set of executable instructions configured, when executed to cause the at least one processor, using the GUI module, to perform the steps of:

a) generating and displaying a set of deliverables, each deliverable associated with a task container;

b) generating and displaying an indicator associated with at least one of: a resource, and a sprint;

c) generating and displaying a plurality of timeline indicators, each timeline indicator associated with a corresponding deliverable; and d) generating and displaying a plurality of progress indicators, each progress indicator associated with the corresponding deliverable.

15. The CRM of claim 11, wherein the set of executable instructions configured, when executed to cause the at least one processor, to perform the steps of:

a) using machine learning analyzing at least one of: critical clusters of task containers, and critical risks of critical clusters: and b) displaying the at least one of: the critical clusters, and the critical risks.

16. The CRM of claim 15, wherein the set of executable instructions configured, when executed to cause the at least one processor, using a workflow management module in communication with the GUI module, the workflow management module comprising a workflow database with data associated with at least one of: the milestones, the task containers, and the deliverables, to perform the steps of synchronizing each of: the milestones, the task containers, and the deliverables with the workflow database.

17. The CRM of claim 11, wherein the set of executable instructions configured, when executed to cause the at least one processor, using the GUI module to display an interdependency indicator between, or among projects' milestones.

18. The CRM of claim 12, wherein the set of executable instructions configured, when executed to cause the at least one processor, using the GUI module to display an interdependency indicator between or among workstreams' task containers.

19. The CRM of claim 17, wherein the set of executable instructions configured, when executed to cause the at least one processor, using the GUI module to display an interdependency indicator between, or among at least one of: workstreams, and deliverables.

20. The CRM of claim 14, whereby in the step of generating and displaying a set of deliverables, the set of executable instructions configured, when executed to cause the at least one processor, using the GUI module and the display module, to perform the steps of:

a) determining the slack of each deliverable relative to at least one of: a start date, and a finish of the task container's timeline; and b) displaying the set of deliverables as floating within the task container.

* * * * *